July 20, 1954  G. ARMSTRONG  2,683,952
SNARE FOR CATCHING WILD ANIMALS
Filed Feb. 10, 1950
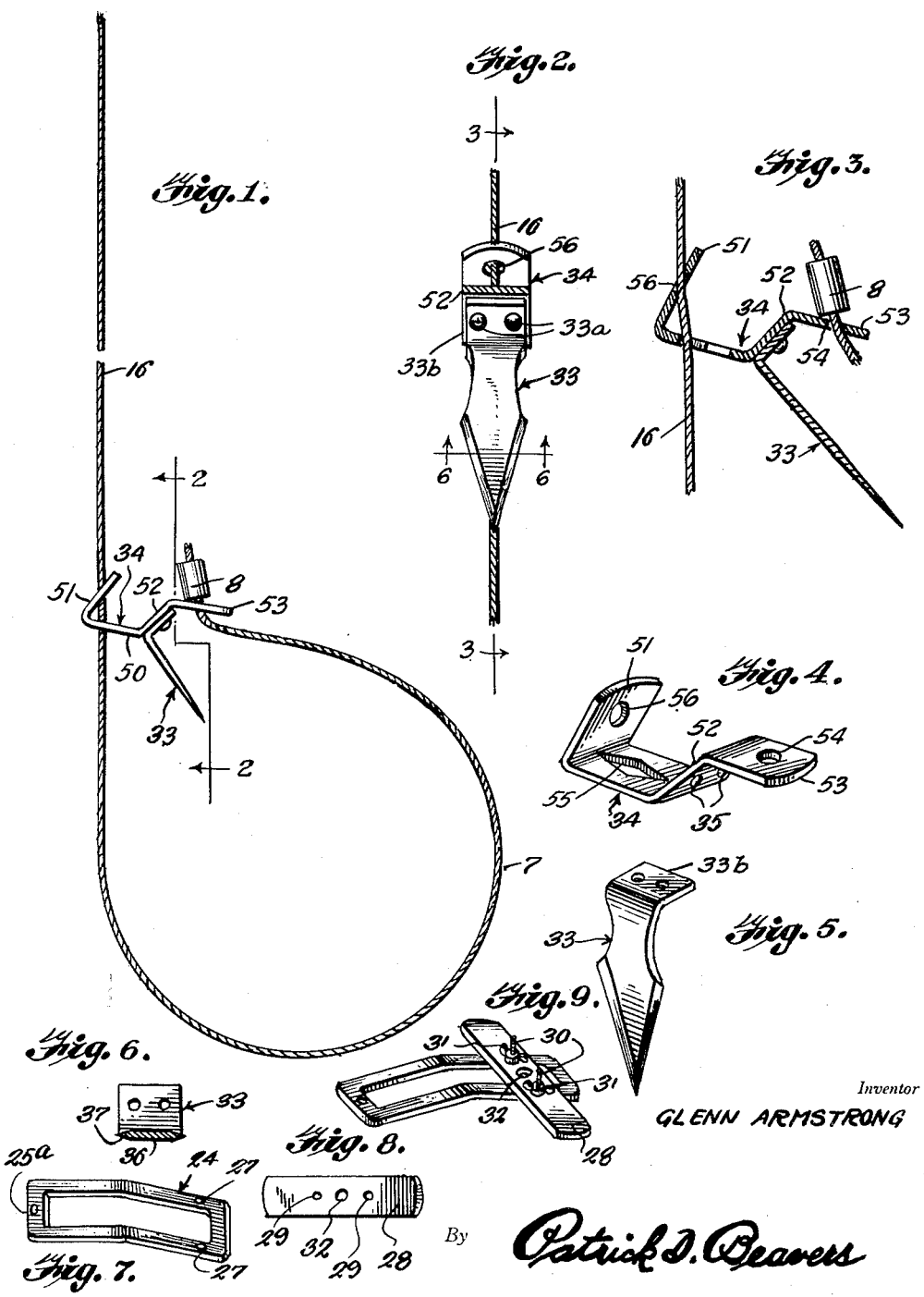
Inventor
GLENN ARMSTRONG
By Patrick J. Beavers
Attorney Patented July 20, 1954

2,683,952

UNITED STATES PATENT OFFICE 2,683,952

SNARE FOR CATCHING WILD ANIMALS

Glenn Armstrong, Lone Fountain, Va.

Application February 10, 1950, Serial No. 143,587

1 Claim. (Cl. 43—87)

The present invention relates to improvements in the art of trapping and more particularly to a snare for ensnaring wild animals.

The principal object of the present invention is to provide an animal snare which includes a loop that will gradually tighten about an animal and which will not loosen, should the animal choose to yield in the direction in which he had been pulling.

Another object of the invention is to provide a snare for catching wild animals which includes a knife at the slip connector of the snare loop which will penetrate into the animal, the more he exerts pull on the loop.

Further objects of the invention reside in a non-return loop connector, a swivel connection and special hanger means, going together to establish a very practical snare for the purpose declared.

Still a further object of the invention is to provide a snare apparatus of the character stated which is of sturdy construction, positive acting and not susceptible to the ready development of defects.

These and various other objects and advantages of the invention will become apparent to the reader of the following description.

In the drawings:

Figure 1 is a fragmentary side elevational view of the snare with the knife installed.

Figure 2 is an enlarged sectional view taken substantially on line 2—2 of Figure 1.

Figure 3 is a fragmentary sectional view taken on line 3—3 of Figure 2.

Figure 4 is a perspective view of the slip connector shown in Figure 1, the knife being removed.

Figure 5 is a perspective detail view of the knife detached.

Figure 6 is a cross section through the knife taken on line 6—6 of Figure 2.

Figure 7 is a perspective view of a slightly modified form of hanger.

Figure 8 is a perspective view of the cross bar of the hanger.

Figure 9 is a perspective view of the form of the hanger shown in Figures 7 and 8, shown assembled.

Referring to the drawings wherein like numerals designate like parts, it can be seen that numeral 16 denotes an elongated multi-strand snare line, one end of which is provided with a stop collar 8, the line itself being disposed through an assembly denoted by numeral 34.

The assembly 34 consists of a substantially U-shaped element 50 having leg portions 51, 52, slanting laterally, as shown in Figure 1 and the leg 52 has a lip 53, which is laterally disposed and has an opening 54 therein for receiving the collar end of the snare line 16. This snare line extends through an opening 55 in the bight portion of the U-shaped element, this diamond shaped opening 55 having converging edge portions into which the line can engage. The leg portion 51 has an opening 56 therein through which the line 16 is trained.

To the leg portion 52 is attached by rivets 33a or other means, a knife 33. This knife has a foot portion 33b that permits securing of the knife to said leg portion 52. The knife 33 projects into the loop or noose formed by the snare line 16, as is clearly shown in Figure 1.

A modified hanger is shown in Figures 6, 7 and 8. This consists of a hanger member 24, which has an opening 25a at one end for the connecting line 16, while at its other end portion a pair of openings 27, 27 are formed. A cross bar 28 cooperates with the hanger 24 and this bar has a pair of openings 29, 29 therein registering with the openings 27, 27 and to accommodate bolts 30, 30 which are each equipped with a wing nut 31. Between the openings 29, 29 is a third opening 32. The connecting line 16 is disposed upwardly through the opening 25a and downwardly through the opening 32 in the bar 28. This particular form of hanger or anchoring means is not only foolproof, but is especially desirable when long length snares are used.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

An animal snare comprising an elongated flexible line having a stop collar at its free end, a connector consisting of a U-shaped element having spaced substantially parallel inclined leg portions, the bight portion of the U-shaped element being formed with an opening having converging edges and through which the flexible line extends, said line also extending through an opening in one leg portion of the U-shaped element, and a dagger shaped element secured to the outside of the other leg, the latter leg being provided with a laterally extending portion having an opening therein for receiving the collar end of the flexible line, said portions being constructed and arranged to accord the daggerlike structure to project into and substantially radially directed in the loop formed by the disposition of the flexible line in connection with the connector.

References Cited in the file of this patent

UNITED STATES PATENTS

| Number | Name | Date |
|---|---|---|
| 1,400,007 | Spakes | Dec. 13, 1921 |
| 1,402,753 | Fairbanks | Jan. 10, 1922 |
| 1,732,919 | Thompson | Oct. 22, 1929 |
| 1,738,907 | Kleffman | Dec. 10, 1929 |
| 1,776,782 | Carr | Sept. 30, 1930 |
| 1,933,855 | Johnson | Nov. 7, 1933 |
| 2,049,684 | Bongiovanni | Aug. 4, 1936 |
| 2,141,865 | Hermann | Dec. 27, 1938 |
| 2,434,318 | Haubert | Jan. 13, 1948 |
| 2,537,894 | Haviland | Jan. 9, 1951 |

FOREIGN PATENTS

| Number | Country | Date |
|---|---|---|
| 13,890 | Great Britain | 1912 |
| 25,699 | Norway | Mar. 22, 1915 |